(12) United States Patent
Dede (10) Patent No.: US 10,811,187 B2
(45) Date of Patent: Oct. 20, 2020

(54) METHODS OF FABRICATING THERMAL COMPOSITES HAVING SPECIFICALLY DESIGNED PARTICLE DISTRIBUTIONS

(71) Applicant: Toyota Motor Engineering & Manufacturing North America, Inc., Plano, TX (US)

(72) Inventor: Ercan M. Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 141 days.

(21) Appl. No.: 16/134,275

(22) Filed: Sep. 18, 2018

(65) Prior Publication Data

US 2020/0090862 A1     Mar. 19, 2020

(51) Int. Cl.
| | |
|---|---|
| *H01F 41/02* | (2006.01) |
| *B29C 39/22* | (2006.01) |
| *C08J 5/24* | (2006.01) |
| *B29C 39/00* | (2006.01) |
| *H02K 1/02* | (2006.01) |
| *H01F 1/08* | (2006.01) |
| *B29C 39/38* | (2006.01) |
| *H02K 1/27* | (2006.01) |
| *B29K 63/00* | (2006.01) |
| *B29K 509/04* | (2006.01) |

(52) U.S. Cl.
CPC ....... *H01F 41/0266* (2013.01); *B29C 39/003* (2013.01); *B29C 39/22* (2013.01); *B29C 39/38* (2013.01); *C08J 5/24* (2013.01); *H01F 1/083* (2013.01); *H02K 1/02* (2013.01); *B29K 2063/00* (2013.01); *B29K 2509/04* (2013.01); *B29K 2995/0008* (2013.01); *C08J 2363/00* (2013.01); *H02K 1/2706* (2013.01)

(58) Field of Classification Search
CPC ... C08L 63/00; B29K 2995/0008; C08K 3/38; C08K 2003/382; C08K 2003/385; B29C 39/38; B29C 43/56; B29C 2043/568
USPC .................................................. 264/435–437
See application file for complete search history.

(56) References Cited

U.S. PATENT DOCUMENTS

| 8,277,936 B2 | 10/2012 | Boussaad |
| 2001/0004546 A1 | 6/2001 | Tobita et al. |

(Continued)

FOREIGN PATENT DOCUMENTS

JP     2010189522 A     9/2010

OTHER PUBLICATIONS

Lin, et al., Magnetic Alignment of Hexagonal Boron Nitride Platelets in Polymer Matrix: Toward High Performance Anisotropic Polymer Composites for Electronic Encapsulation, 2013, ACS Publications, Atlanta.

(Continued)

*Primary Examiner* — Brieann R Johnston
(74) *Attorney, Agent, or Firm* — Dinsmore & Shohl LLP (57) ABSTRACT

A method for fabricating a thermal composite includes pouring a mixture including a plurality of magnetically susceptible particles and a thermosetting polymer into a mold, placing the mold containing the mixture in a chamber including a plurality of magnet arrays, and heating the mold containing the mixture in the chamber for a time and at a temperature sufficient to cure the thermosetting polymer. At least one of the plurality of magnet arrays includes a Halbach array.

18 Claims, 5 Drawing Sheets

(56) References Cited

U.S. PATENT DOCUMENTS

| | | | |
|---|---|---|---|
| 2015/0194661 A1* | 7/2015 | Ju | B01J 19/088 204/164 |
| 2017/0001388 A1* | 1/2017 | Hemmen | F26B 5/04 |
| 2017/0074952 A1* | 3/2017 | Kantzas | G01R 33/307 |
| 2018/0094182 A1 | 4/2018 | Hung et al. | |

OTHER PUBLICATIONS

Yuan, et al., Thermal Conductivity of Polymer-Based Composites with Magnetic Aligned Hexagonal Boron Nitride Platelets, 2015, ACS Publications, China.

* cited by examiner

METHODS OF FABRICATING THERMAL COMPOSITES HAVING SPECIFICALLY DESIGNED PARTICLE DISTRIBUTIONS

TECHNICAL FIELD

The present specification generally relates to methods for forming thermal composites and, more specifically, methods for forming thermal composites with specifically designed thermally conductive particle distributions.

BACKGROUND

Thermal composites fabricated using conventional pre-impregnated ("pre-preg") approaches may include a fiber laminate embedded within a matrix material and unidirectionally aligned. However, complex orientations of high thermal conductivity particles are difficult to achieve. Thermal composites having such complex orientations may enable complex heat flow control metamaterial functions, including, for example, heat flux cloaking, focusing, or guiding.

Accordingly, a need exists for alternative methods for forming thermal composites with specifically designed thermally conductive particle distributions.

SUMMARY

In one embodiment, a method for fabricating a thermal composite may include pouring a mixture including a plurality of magnetically susceptible particles and a thermosetting polymer into a mold, placing the mold containing the mixture in a chamber including a plurality of magnet arrays, and heating the mold containing the mixture in the chamber for a time and at a temperature sufficient to cure the thermosetting polymer. At least one of the plurality of magnet arrays includes a Halbach array.

In another embodiment, a method for fabricating a thermal composite may include pouring a mixture including a plurality of functionalized boron nitride particles and an epoxy matrix into a mold, placing the mold containing the mixture in a chamber including a plurality of magnet arrays, and heating the mold containing the mixture in the chamber for a time and at a temperature sufficient to cure the epoxy. At least one of the plurality of magnet arrays includes a Halbach array.

In yet another embodiment, a thermal composite includes a plurality of functionalized boron nitride particles dispersed in a cured epoxy matrix. The plurality of functionalized boron nitride particles are oriented according to a magnetic field applied by a plurality of magnet arrays including Halbach arrays.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
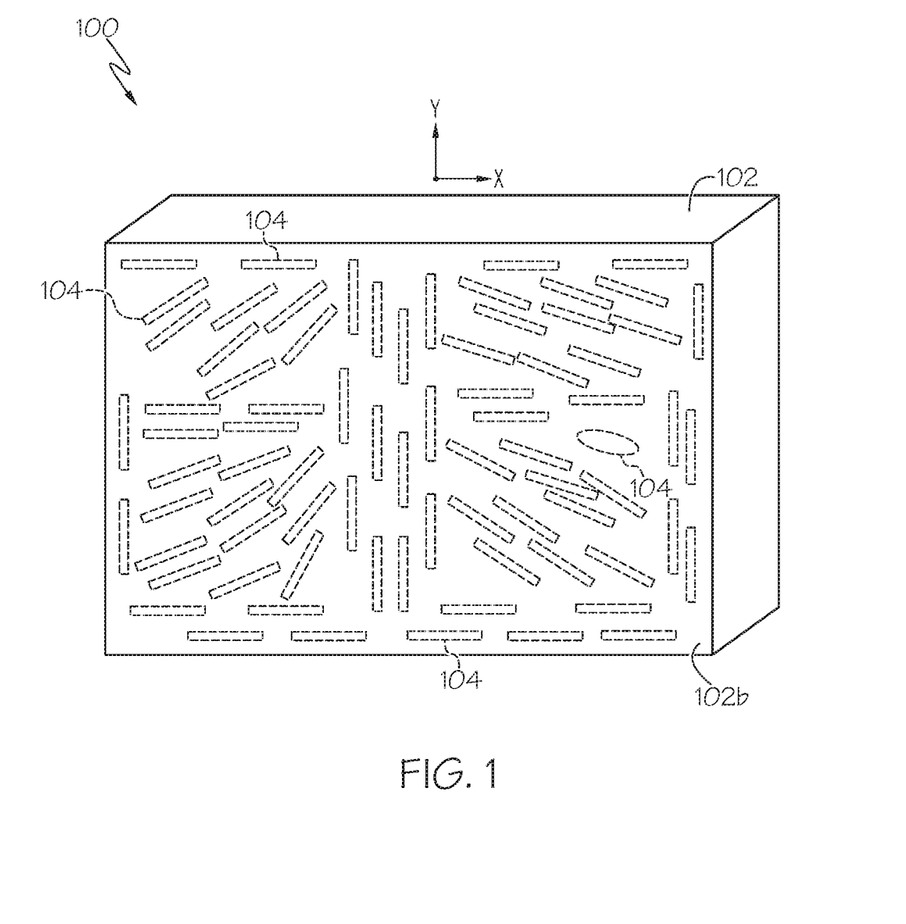
FIG. 1 depicts a perspective view of a composite material according to one or more embodiments shown and described herein.

FIG. 1 generally depicts a thermal composite 100, sometimes referred to as a thermal flux steering device. The thermal composite 100 includes a matrix 102 impregnated with a plurality of magnetically susceptible particles 104. The magnetically susceptible particles 104 are oriented according to a magnetic field applied by a plurality of magnet arrays including Halbach arrays, as will be described in greater detail herein. Various embodiments of the thermal composite, methods of manufacturing the thermal composite, and the use of the thermal composite will be described in more detail herein.

Referring now to FIG. 1, a perspective view of the matrix 102 is provided. The matrix 102 may be formed from a polymer, a ceramic, a cyanate-ester resin, or another material sufficient to hold the plurality of magnetically susceptible particles 104 in place at the particular orientation applied by the plurality of magnet arrays. For example, the matrix 102 may be a plastic, an epoxy resin, or any other thermal curable matrix material. Plastics that may be used can include, by way of example and not limitation, nylon. In various embodiments, the matrix 102 is an insulative material, a low electrical conductivity material, and/or a low magnetic permeability material. Although FIG. 1 depicts the matrix 102 having a generally planar surface 102b, it is contemplated that the surface 102b of the matrix 102 may be non-uniform, such as being undulated or bowed. Additionally, the matrix 102 is shown as being formed as one layer, although it is contemplated that the matrix 102 may include a plurality of layers, each including a plurality of magnetically susceptible particles 104.

The magnetically susceptible particles 104 may be any type of particle that is susceptible to magnetism and is alignable. As used herein, "magnetically susceptible" means that the particle responds to an applied magnetic field. In various embodiments, the magnetically susceptible particles 104 are non-spherical in shape. For example, in various embodiments, the magnetically susceptible particles 104 may include functionalized hexagonal boron nitride (mhBN) particles or ferrite particles. In some embodiments, the magnetically susceptible particles 104 may be in the form of a ferrofluid.

In various embodiments, the magnetically susceptible particles 104 have one or more anisotropic properties. For example, the magnetically susceptible particles 104 may have an anisotropic thermal conductivity and/or an anisotropic coefficient of thermal expansion (CTE). Other anisotropic properties are contemplated. Accordingly, the magnetically susceptible particles 104 may be oriented in different directions in order to achieve the non-uniform guiding of thermal energy relative to the surface 102b of the matrix 102.

In some embodiments, the magnetically susceptible particles 104 have thermal properties that differ from the thermal properties of the matrix 102. For example, in some embodiments, the magnetically susceptible particles 104 have a thermal conductivity that is greater than a thermal conductivity of the matrix.

One example of a magnetically susceptible particle that has anisotropic properties is magnetically responsive hexagonal boron nitride (mhBN), which may be prepared from hexagonal boron nitride (hBN) particles, as will be explained below. In particular, hexagonal boron nitride (hBN) platelets are non-spherical in shape, have a high in-plane thermal conductivity (~600 W/mK) and a low in-plane coefficient of thermal expansion (CTE) (−2.7 ppm/K), and have a low out-of-plane thermal conductivity (30 W/mK) and large out-of-plane CTE (38 ppm/K). Because of the anisotropic properties of hBN particles, composites in which the particles are randomly oriented exhibit poor performance. However, in various embodiments, the hBN particles may be functionalized to enable the particles to be aligned using magnetic fields.

By aligning the magnetically susceptible particles in a particular orientation, the anisotropic properties of the magnetically susceptible particles may be leveraged to enable the magnetically susceptible particles to guide thermal energy along a predetermined path. Specifically, the magnetically susceptible particles may be oriented between an angle of zero and one hundred and eighty degrees with respect to the X and Y axis shown in FIG. 1. In particular, in some embodiments, a thermal composite in which the hBN particles are aligned may have a reduced CTE and an enhanced thermal conductivity as compared to a similar thermal composite in which the hBN particles are randomly oriented.

More particularly, in various embodiments, magnetically responsive hBN (mhBN) particles may be prepared from commercially available hBN particles by surface modification using superparamagnetic iron oxide nanoparticles. Suitable commercially available hBN particles include, by way of example and not limitation, hexagonal boron nitride powder (AC6041) available from Momentive Performance Materials Inc. Suitable commercially available magnetic iron oxide nanoparticles include the water-based ferrofluid available under the trade name EMG 605 from Ferrotec. Other materials, from other sources, may be used.

The surface modification results in the attachment of iron oxide nanoparticles to the hBN surface through electrostatic interaction between the positively charged ion oxide nanoparticles and negative charged hBN platelets. In particular, the hBN powder can be mixed with the ferrofluid and incubated for a period of time sufficient to allow bonding between hBN and iron oxide nanoparticles. The resulting mhBN powder may then be separated from the suspension. Additional details on the modification of hBN particles to form mhBN particles may be found in Z. Lin et al., "Magnetic Alignment of Hexagonal Boron Nitride Platelets in Polymer Matrix: Toward High Performance Anisotropic Polymer Composites for Electronic Encapsulation," *ACS Appl. Mater. Interfaces* 2013, 5, 7633-7640, the entire contents of which is hereby incorporated by reference. In various embodiments, the resulting mhBN particles can orient themselves along the direction of an external magnetic field to minimize the magnetic energy.

In various embodiments, the magnetically susceptible particles 104 are oriented by applying a magnetic field generated by a plurality of magnet arrays to the magnetically susceptible particles 104. The magnetic field applied to the magnetically susceptible particles 104 varies depending on the particular embodiment and, in various embodiments, is specifically designed based on the objective of the thermal composite 100.

Figure 2:
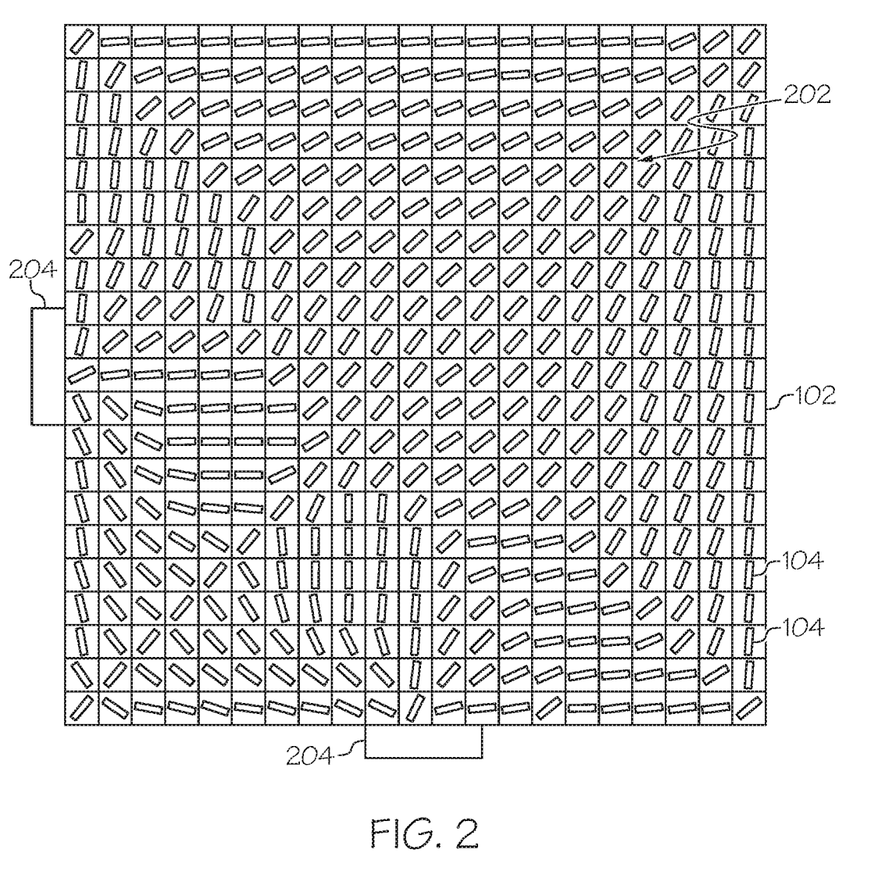
FIG. 2 depicts a cross-section of the composite material showing the magnetically susceptible particles oriented at various angles according to one or more embodiments shown and described herein.

For example, as shown in FIG. 2, the magnetic field may be specifically designed to form a path for thermal energy radiating from a thermal source 202 to a heat sink 204 through the matrix 102. Accordingly, in the embodiment depicted in FIG. 2, the matrix 102 is in thermal communication with both the thermal source 202 and the heat sink 204. In particular, the thermal source 202 is applied to the surface of the matrix 102 and the magnetically susceptible particles 104 being oriented at various angles. The thermal source 202 may be, by way of example and not limitation, an electronic component, an internal combustion engine, a motor, an electromechanical system, or another source capable of generating thermal energy. In FIG. 2, the magnetically susceptible particles 104 are distributed throughout the matrix 102 and are oriented so as to steer the thermal energy from the thermal source 202 to the heat sink 204. However, it is contemplated that in other embodiments, the magnetically susceptible particles 104 may be oriented to achieve a different thermal energy management objective.

In the embodiment shown in FIG. 2, the magnetically susceptible particles 104 are aligned generally vertically (90 degrees) along the right edge of the matrix 102 so as to reduce thermal resistance. The alignment of the magnetically susceptible particles transitions to a horizontal position so as to steer thermal energy toward the upper top portion of the matrix 102, as shown in FIG. 2. As the thermal energy is steered towards the left hand side of the matrix 102, the magnetically susceptible particles are aligned at approximately a 45 or 135 degree angle so as to steer the thermal energy towards the heat sink 204 disposed at the bottom and left of the matrix 102.

The heat sink 204 may be configured to dissipate or harvest the thermal energy it receives. While the embodiment depicted in FIG. 2 includes the heat sink 204, it should be understood that other embodiments may not include the heat sink 204, such as embodiments in which the thermal composite 100 only guides thermal energy away from the thermal source 202 but does not guide the energy to a particular location or locations. Additionally, although depicted in the FIGS. as being distributed generally uniformly throughout the matrix 102, it is contemplated that in some embodiments, certain areas of the matrix 102 may contain a higher concentration of the magnetically susceptible particles 104 than other areas.

Figure 3:
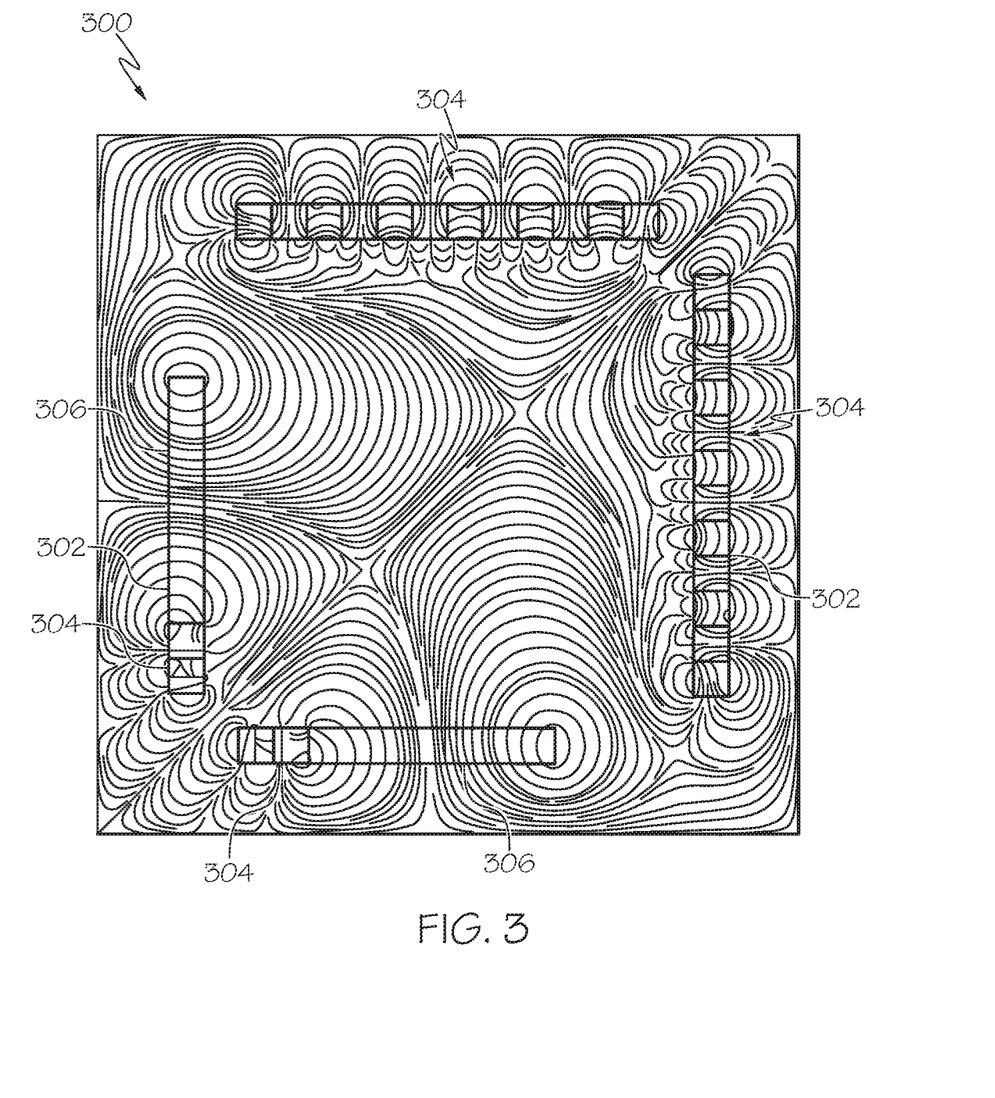
FIG. 3 is an example magnetic flux density diagram for orienting the magnetically susceptible particles as shown in FIG. 2.

FIG. 3 depicts a magnetic flux density diagram 300 including a plurality of magnet arrays 302 that may be used to orient the magnetically susceptible particles as shown in FIG. 2. The magnetic flux density diagram 300 shows that the magnetic field may be converged, focused, isolated, concentrated, diverged, or guided along a preferred direction. As shown in FIG. 3, the magnet arrays 302 include Halbach arrays 304 and/or other magnets 306. For example, the magnet arrays 302 across the top and down the right side of FIG. 3 are made up entirely of Halbach arrays 304, while the magnet arrays 302 across the bottom and down the left side of FIG. 3 each include Halbach arrays 304 and other magnets 306. It is further contemplated that, in some embodiments, some of the magnet arrays may include only other magnets 306. In various embodiments, the other magnets may include, by way of example and not limitation, electromagnets and rare earth magnets. However, in various embodiments described herein, at least one magnet array includes a Halbach array.

Each Halbach array includes a number of permanent magnets arranged adjacent each other and having magnetic fields directions for each permanent magnet arranged in a particular configuration. In other words, a Halbach array is a special pattern or arrangement of permanent magnets having different magnetization directions. The Halbach array may have an unusual magnetic field pattern in which flux lines are concentrated on one side of the array, as shown in FIG. 3.

As can be seen from the orientation of the magnetically susceptible particles in FIG. 2 and the magnetic flux diagram of FIG. 3, the Halbach arrays may be used to finely control the arrangement and distribution of the magnetically susceptible particles 104 in order to non-uniformly guide the thermal energy received by the thermal composite 100 according to a thermal energy management objective (e.g., guiding the thermal energy away from the thermal source 202 and to the heat sink 204, as depicted in FIG. 2).

In various embodiments, a magnetic flux diagram (as described in FIG. 3) may be generated, and magnet arrays 302 are formed based on the generated magnetic flux diagram to achieve the thermal energy management objective. For example, a computer may automatically generate a layout of the magnetically susceptible particles based on a thermal energy flow map and the magnet arrays may be formed so as to orient the magnetically susceptible particles according to the generated layout. One example method for determining a layout of the magnetically susceptible particles to achieve a thermal energy management objective is described in E. Dede, "Simulation and optimization of heat flow via anisotropic material thermal conductivity," Computational Materials Science 50 (2010) 510-515, the entire contents of which is hereby incorporated by reference.

In still other embodiments, the magnet arrays may be formed according to a design scheme generated by a computer. For example, a computer may automatically generate a layout of a magnetic pattern to produce a magnetic flux density to achieve a thermal energy management objective. The layout of the magnetic pattern may include, for example, the pattern of permanent magnet magnetization directions and the shape of the permanent magnets in a Halbach array as well as specific combinations of Halbach arrays and other magnets. One example method for determining a layout of the magnetic arrays to achieve a thermal energy management objective uses a topology optimization technique and is described in detail J. Lee, "Topology optimization of Halbach magnet arrays using isoparametric projection," Journal of Magnetism and Magnetic Materials 432 (2017) 140-153, the entire contents of which is hereby incorporated by reference. Such methods can assist in determining a magnetization pattern and the shape of individual permanent magnet segments in a Halbach array with little or no user input. However, it is contemplated that the layout of the magnetic pattern may be determined in accordance with other methods.

In order to manufacture a thermal composite with a specifically designed thermally conductive particle distribution, the magnetically susceptible particles 104 are mixed with a matrix material, such as an epoxy or other thermosetting polymer. The amount of the magnetically susceptible particles 104 in the mixture may vary depending on the particular embodiment. In some embodiments, the mixture may include from about 10 wt % to about 50 wt % magnetically susceptible particles, from about 12 wt % to about 40 wt % magnetically susceptible particles, or from about 15 wt % to about 30 wt % magnetically susceptible particles based on a total weight of the mixture. In some embodiments, the amount of magnetically susceptible particles may be limited by the viscosity of the mixture, which increases with an increasing amount of magnetically susceptible particles and may limit the ability of the magnetically susceptible particles to be oriented. The mixture may further include curing agents, catalysts, and other ingredients, depending on the particular thermal composite. In various embodiments, the mixture is then poured into a mold (shown in phantom as mold 406 in FIG. 4), which supports, shapes, and contains the mixture. The mold 406 can be of any desired size and shape, and may vary depending on the particular embodiment.

Figure 4:
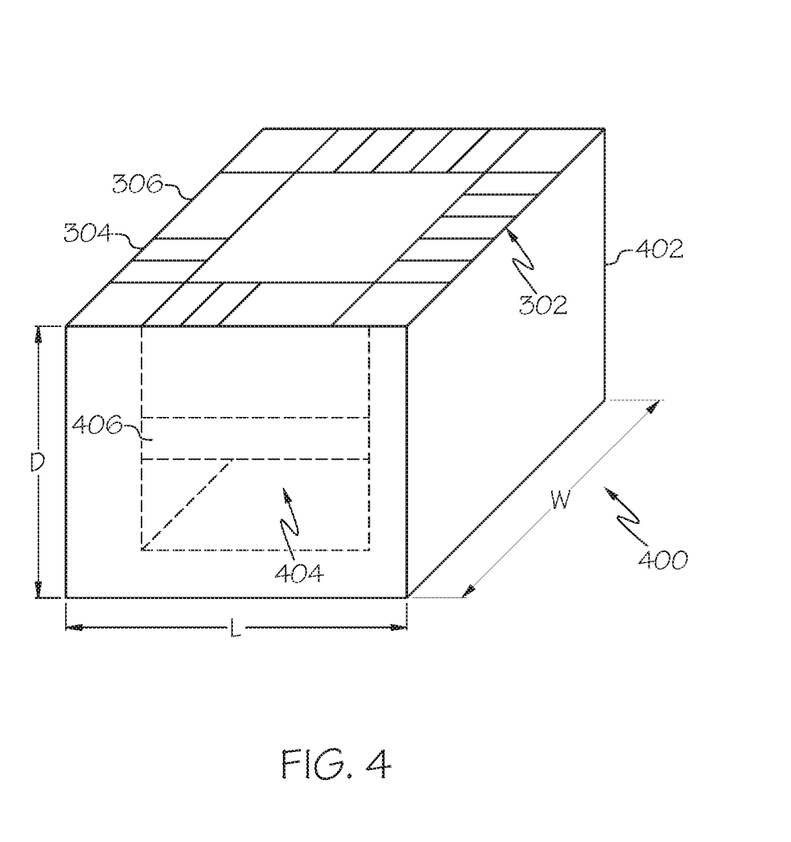
FIG. 4 is a chamber including a plurality of magnet arrays according to one or more embodiments shown and described herein.

Next, the mold 406 may be placed within a chamber 400 including a plurality of magnet arrays 302. For example, as shown in FIG. 4, the chamber 400 includes magnet arrays 302, which include Halbach arrays 304 and/or other magnets 306, which may include electromagnets and/or rare earth magnets. The magnet arrays 302 may line the walls 402 of the chamber 400, such as by being affixed along the walls 402 on the interior volume 404 of the chamber 404, or the magnet arrays 302 may be used as walls 402, thereby defining the interior volume 404 of the chamber 400. In various embodiments, the chamber 400 completely surrounds and encloses the mold 406 including the mixture of the epoxy and the magnetically susceptible particles. Without being bound by theory, it is believed that enclosing the mold 406 within the chamber 400 such that the magnet arrays 302 extend beyond the edges of the mold 406 may reduce or eliminate magnetic field end effects that can occur near the ends of the magnets. However, it is contemplated that in some embodiments, the mold 406 may extend beyond the end of a magnet array 302, such as when the chamber 400 is in the form of a tunnel having open ends.

In embodiments, the magnet arrays 302 lining the walls 402 of the chamber 400 generate a magnetic field, such as a magnetic field represented by the magnetic flux diagram of FIG. 3. Depending on the specific orientation of the magnet arrays 302 along the walls 402 of the chamber 400, complex magnetic fields can be generated within the chamber 400.

Although the chamber 400 is depicted as including a single magnet array 302 on each of the four sides of the chamber 400, it is contemplated that in other embodiments, the magnet arrays 302 may extend along the length L, width W, and depth D of the chamber 400. Accordingly, the magnet arrays 302 may have a depth equal to the depth D of the chamber 400, or multiple magnet arrays 302 may be arranged along the depth D of the chamber 400. It should be appreciated that the magnet arrays 302 may have different designs as compared to adjacent magnet arrays, such that the magnetic field may vary along the depth D of the chamber 400. Therefore, in some embodiments, the particle distribution and orientation through the depth of the thermal composite may vary to enable the thermal composite to direct thermal energy in three dimensions.

Additionally, it should be understood that in addition to depending on the particular thermal energy flow map, the number and location of the magnet arrays may vary depending on the strength of the magnetic field generated by the magnet arrays. For example, in embodiments in which the magnet arrays generate a strong magnetic field, fewer magnet arrays may be required as compared to embodiments in which the magnet arrays generate a comparatively weaker magnetic field.

While the mold 406 is within the chamber 400, the magnetically susceptible particles are oriented generally with the magnetic flux generated by the magnet arrays 302. For example, the magnetically susceptible particles may be oriented as shown in FIG. 3. Accordingly, in various embodiments, in order to maintain the orientation of the magnetically susceptible particles, the thermosetting polymer is at least partially cured while the mold 406 including the mixture is within the chamber 400. In such embodiments, the magnetic field is applied to the magnetically susceptible particles throughout the curing process.

In various embodiments, the chamber 400 may be positioned within a furnace or oven and heated for a time and at a temperature sufficient to at least partially cure the thermosetting polymer. In some embodiments, pressure may also be applied to cure the thermosetting polymer. The particular time and temperature may vary depending on the particular thermosetting polymer employed. In some embodiments, the thermosetting polymer may be heated to a temperature of greater than or equal to about 75° C., greater than or equal to about 100° C., or greater than or equal to about 150° C. In particular embodiments, the temperature may vary over time, such as in a step-wise curing process in which the thermosetting polymer is heated to a first temperature for a first period of time and then heated to a second temperature for a second period of time. For example, the thermosetting polymer may be heated to 100° C. for about 12 hours and then heated to about 150° C. for about 1 hour. Other curing profiles, including other temperatures and time periods, are contemplated. Although in the embodiments described herein, a chamber 400 including magnet arrays 302 is placed within a furnace, it is contemplated that in other embodiments, the magnet arrays 302 may be incorporated into the furnace.

In embodiments, the thermosetting polymer may be completely cured in the furnace, although it is contemplated that in other embodiments, the thermosetting polymer is partially cured to a point to prevent movement or reorientation of the magnetically susceptible particles upon removal from the chamber 400. After the thermosetting polymer is cured to maintain the orientation of the magnetically susceptible particles, the chamber 400 may be removed from the furnace, and the mold 406 may be removed from the chamber 400.

Although a single layer of the matrix has been described herein, some embodiments may include a plurality of layers, with each layer including magnetically susceptible particles. In such embodiments, the plurality of layers may be stacked to achieve the non-uniform guiding of the thermal energy to accomplish the thermal energy management objective.

Figure 5:
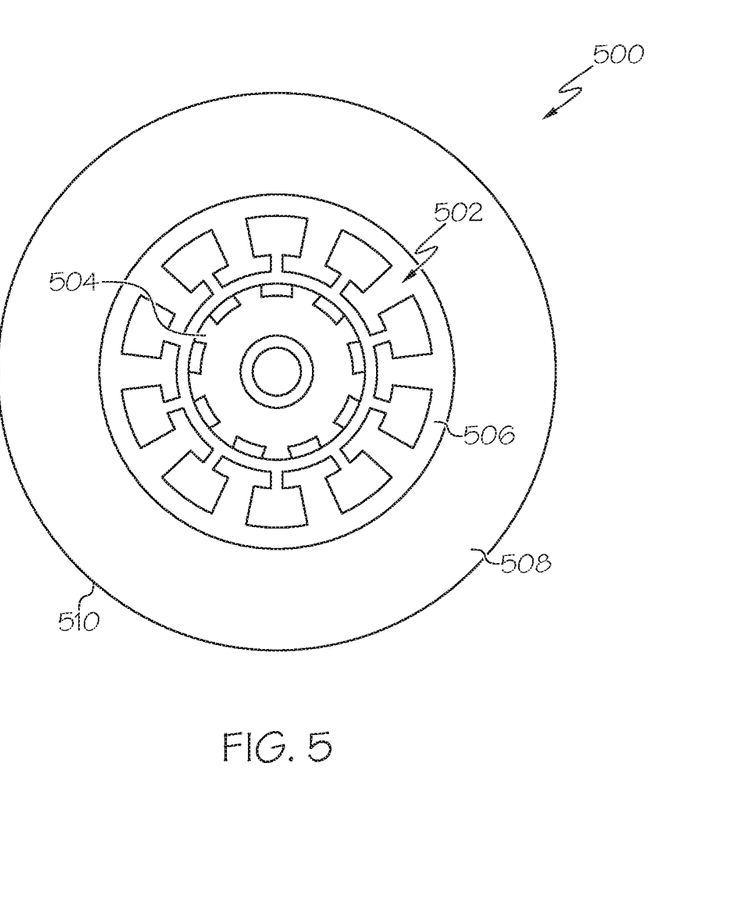
FIG. 5 depicts a front view of a heat transfer management apparatus surrounding an electric motor according to one or more embodiments shown and described herein.

Referring now to FIG. 5, an embodiment of a heat transfer management apparatus 500 is depicted. In this embodiment, the heat transfer management apparatus 500 includes a thermal composite 508 that is filled around an electromechanical machine, such as an electric motor 502. The electric motor 502 includes a rotor 504 that is adapted to rotate within a stator 506, generating a motive force of the rotor 504. In the depicted embodiment, the strength of the motive force is based on the amount of electricity passing through the windings (not shown) of the stator 504 and the strength of the magnetic force of the rotor 504. As the amount of electricity passing through the windings increases, the motive force provided by the rotor 504 generally increases.

The increase in electricity passing through the windings, however, generally corresponds to an increase in the operating temperature of the electric motor 502. To manage the temperature of the stator 506 of the electric motor 502, the heat transfer management apparatus 500 may include the thermal composite 508 around the stator 506 to draw heat flux away from the stator 506, thereby reducing the temperature of the stator 506. In various embodiments, the thermal composite 508 may completely surround the stator, such as by filling otherwise dead air volume around the windings and/or between the stator 506 and a surface 510 of the motor. In some embodiments, the surface 510 of the electric motor 502 may be externally cooled.

In such embodiments, the thermal composite 508 may be formed as described above (e.g., by pouring a mixture including the uncured thermosetting polymer and magnetically susceptible particles into a mold), or the thermal composite 508 may be formed in place around the stator 506. For example, in various embodiments, the mixture including the uncured thermosetting polymer and magnetically susceptible particles may be poured into the space between the stator 506 and the surface 510 of the electric motor 502, and the electric motor 502 may be placed within a chamber including magnet arrays and then into the furnace to cure the thermosetting polymer, thereby forming the thermal composite.

In still other embodiments, the methods described herein may be used to fabricate composite vehicle structures, such as art of a frame or mount. In such embodiments, the thermal composite can be molded into the desired shape, and the magnetically susceptible particles can be oriented to conduct heat in a particular direction. For example, a frame or mount that holds a vehicular component that heats up, such as an engine or electronic components, may be formed from the thermal composite to remove heat from the component to a heat sink or other location where the heat can be dissipated.

In another embodiment, non-structural panels of a vehicle may be formed from the thermal composite. For example, a hood panel may be formed from the thermal composite. Accordingly, when the hood panel receives heat radiated away from another object, such as the engine, the hood panel may conduct heat away from the engine according to the thermal energy management objective.

Additionally or alternatively, in some embodiments, the thermal composite may be applied as a coating on a substrate. The substrate may be, by way of example and not limitation, a panel, a frame structure, a surface of an electronic component, or any surface in contact with a thermal energy source. In such embodiments, the mixture including the thermosetting polymer and the magnetically susceptible particles may be sprayed onto the surface of the substrate, and the substrate placed in the chamber. As described above, the chamber including the substrate may be exposed to heat and/or pressure sufficient to cure the thermosetting polymer on the surface of the substrate. Accordingly, the thermal composite coating may enhance the thermal conductivity of the substrate or enable the substrate to move heat in a predetermined direction.

It should now be understood that the methods for fabricating thermal composites described herein may provide for the fabrication of thermal composites including magnetically susceptible particles that are particularly oriented to achieve enhanced management of thermal energy flow to or away from one or more locations in the thermal composite. The magnetically susceptible particles are oriented by applying a magnetic field generated by a plurality of magnet arrays, at least one of which includes a Halbach array, and the matrix is cured while the magnetic field is applied. By curing the matrix while the magnetic field is applied, the magnetically susceptible particles may be maintained in their orientation after the magnetic field is removed. The use of Halbach arrays in orienting the magnetically susceptible particles provides for fine control of the orientation of the particles to achieve a number of potentially complicated thermal management objectives.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for fabricating a thermal composite comprising:
   pouring a mixture comprising a plurality of magnetically susceptible particles and a thermosetting polymer into a mold;
   placing the mold containing the mixture in a chamber comprising a plurality of magnet arrays, wherein at least one of the plurality of magnet arrays comprises a Halbach array;
   applying an external, non-uniform magnetic field generated by the plurality of magnet arrays to the magnetically susceptible particles effective to orient the magnetically susceptible particles in a predetermined direction; and
   heating the mold containing the mixture in the chamber for a time and at a temperature sufficient to cure the thermosetting polymer.

2. The method of claim 1, wherein the thermosetting polymer comprises an epoxy.

3. The method of claim 1, wherein the magnetically susceptible particles comprise functionalized boron nitride.

4. The method of claim 1, wherein the plurality of magnet arrays further comprise at least one of a rare earth metal or an electromagnet.

5. The method of claim 1, further comprising:
   removing the mold from the chamber after curing the thermosetting polymer, wherein the magnetically susceptible particles remain oriented in the predetermined direction after being removed from the chamber.

6. The method of claim 1, wherein the magnetically susceptible particles have a thermal conductivity that is greater than a thermal conductivity of the thermosetting polymer.

7. The method of claim 1, wherein the magnetically susceptible particles are anisotropic.

8. The method of claim 1, wherein the plurality of magnet arrays extend beyond an edge of the mold.

9. A frame structure comprising a thermal composite fabricated according to the method of claim 1.

10. A vehicle panel comprising a thermal composite fabricated according to the method of claim 1.

11. An electromechanical machine comprising a thermal composite fabricated according to the method of claim 1.

12. A method for fabricating a thermal composite comprising:
    pouring a mixture comprising a plurality of functionalized boron nitride particles and an epoxy matrix into a mold;
    placing the mold containing the mixture in a chamber comprising a plurality of magnet arrays, wherein at least one of the plurality of magnet arrays comprises a Halbach array;
    applying an external non-uniform magnetic field generated by the plurality of magnet arrays to the magnetically susceptible particles effective to orient the magnetically susceptible particles in a predetermined direction; and
    heating the mold containing the mixture in the chamber for a time and at a temperature sufficient to cure the epoxy.

13. The method of claim 12, wherein the plurality of magnet arrays further comprise at least one of a rare earth metal or an electromagnet.

14. The method of claim 12, wherein the plurality of magnet arrays encompass the mold in the chamber.

15. The method of claim 12, further comprising:
    removing the mold from the chamber after curing the epoxy, wherein the functionalized boron nitride particles remain oriented in the predetermined direction after being removed from the chamber.

16. A thermal composite comprising:
    a plurality of functionalized boron nitride particles dispersed in a cured epoxy matrix, wherein the plurality of functionalized boron nitride particles are oriented in a pre-determined and non-uniform orientation according to an external magnetic field applied by a plurality of magnet arrays comprising Halbach arrays.

17. A frame structure or vehicle panel comprising the thermal composite of claim 16.

18. An electromechanical machine comprising the thermal composite of claim 16.

* * * * *